United States Patent [19]
Köhler et al.

[11] Patent Number: 5,341,058
[45] Date of Patent: Aug. 23, 1994

[54] ELECTRIC MOTOR

[75] Inventors: Manfred Köhler, Ruhstorf, a.d. Rott; Roland Kuder, Passau, both of Fed. Rep. of Germany

[73] Assignee: Loher AG, Ruhstorf a.d. Rott, Fed. Rep. of Germany

[21] Appl. No.: 995,991

[22] Filed: Dec. 23, 1992

[51] Int. Cl.[5] .............................................. H02K 5/10
[52] U.S. Cl. ...................................... 310/87; 310/211
[58] Field of Search .................. 310/56, 61, 71, 87, 310/182, 183, 197, 211, 212, 90, 270

[56] References Cited
U.S. PATENT DOCUMENTS

| | | | |
|---|---|---|---|
| 3,060,335 | 10/1962 | Greenwald | 310/54 |
| 3,936,685 | 2/1976 | Glockner et al. | 310/211 |
| 4,250,423 | 2/1981 | Linscott, Jr. | 310/258 |
| 4,562,397 | 12/1985 | Kitabayashi et al. | 310/211 |
| 4,598,219 | 7/1986 | Gaylord et al. | 310/87 |
| 4,644,210 | 2/1987 | Meisner et al. | 310/211 |
| 4,673,835 | 6/1987 | Hohnstein et al. | 310/217 |
| 4,970,424 | 11/1990 | Nakamura et al. | 310/211 |

FOREIGN PATENT DOCUMENTS

| | | | |
|---|---|---|---|
| 0341317 | 11/1987 | European Pat. Off. | 310/211 |
| 297274 | 5/1988 | European Pat. Off. | 310/211 |
| 427917 | 5/1926 | Fed. Rep. of Germany | 310/211 |
| 51-929095 | 4/1965 | Fed. Rep. of Germany | 310/211 |
| 2928393 | 3/1980 | Fed. Rep. of Germany | 310/211 |
| 62-945194 | 1/1983 | Fed. Rep. of Germany | 310/211 |
| 73230699 | 2/1984 | Fed. Rep. of Germany | 310/211 |
| 3729486 | 12/1988 | Fed. Rep. of Germany | 310/211 |
| 82928393 | 4/1989 | Fed. Rep. of Germany | 310/211 |
| 3925337 | 2/1991 | Fed. Rep. of Germany | 310/211 |
| 574685 | 10/1973 | Switzerland | 310/211 |
| 585542 | 3/1947 | United Kingdom | 310/211 |

*Primary Examiner*—Steven L. Stephan
*Assistant Examiner*—Matthew Nguyen
*Attorney, Agent, or Firm*—Morgan & Finnegan

[57] ABSTRACT

An electric motor possesses a motor housing, preferably a pressure-resistant one, wherein a stator is installed and a rotor is journaled for rotation. The pressure-resistant motor housing is preferably filled with gas, more particularly a gas under high pressure of preferably between 5 and 150 bar or greater. In order to reduce heat dissipation in the interior of the electric motor, a capsule is provided, which surrounds the rotor rods at the drive end and/or at the non-drive end.

35 Claims, 4 Drawing Sheets

ELECTRIC MOTOR

BACKGROUND OF THE INVENTION

The present invention relates to an electric motor. More particularly, the invention relates to an electric motor for submersible drives involving high gas pressures in the interior of the motor.

The electric motor possesses a motor housing, preferably pressure-resistant, in which a stator is installed and a rotor is mounted for rotation. The stator consists of a stator lamination pack and a stator winding. A box for electrical connections is generally mounted on the pressure-resistant motor housing. The pressure-resistant motor housing is preferably filled with a gas, more particularly under high pressure. The gas pressure may be between 5 and 150 bar or even higher.

For plants operating under water, as for instance for pumping petroleum and natural gas, particularly in very deep water, electric motors are utilized, which in accordance with the particular drive concept are filled with a liquid or gaseous medium. The pressure-resistant motor housing of such drives is so designed that it is able to resist the pressure in very deep water.

An electric motor of the type mentioned is disclosed in the German patent publication 3,925,337 A 1.

A significant disadvantage of a gas-filled motor according to prior art is that the rotor and fan design for the respective cooling systems cause high frictional losses with the high gas pressure in the interior of the motor with the result that the dissipated heat can not be sufficiently conducted away.

The German patent publication 3,729,486 C1 discloses an electric motor which is accommodated with a compressor. The pressure-resistant housing and the motor are filled with gas in a common pressure-resistant housing. For cooling the motor the gas flows through the motor and an annular cooler or radiator surrounds the housing concentrically.

The European patent publication 0 297 274 and the prior German patent application P 41 00 135.4-32, refer to an electric motor, which together with the machine to be driven are mounted in a water-tight housing capsule. The pressure-resistant housing is filled with a gaseous or liquid medium. This filling surrounds the motor, which is filled with water or with oil.

Although the prior art motors are successful in certain fields of application, they are unsatisfactory with respect to the high frictional losses, and need for complex pressure compensating device and cooling systems.

The German patent 2,945,194 discloses an electric motor, wherein disks are secured to the rotor shaft, which rotate with the rotor shaft and are so arranged on the rotor shaft that between the part, which projects radially past the bore in the stator of the rotating disks and the end surfaces of the stator lamination pack there is in each case a narrow axial gap. Owing to the high speed of rotation of the rotor, the disks, when rotating, fling air out of the axial gap in the part of the disks which projects radially past the bore in the stator, such that the air becomes more rare in the hole in the stator. This causes a reduction in the air friction losses. The pumping action of the rotating disks is furthermore enhanced since pumping grooves are provided on the side, facing the stator lamination pack of the disks. In the case of the German patent 2,945,194 the rarefaction of the gas leads to a reduction in gas friction losses.

Similarly, the electric motor disclosed in the German patent 427,917 has reduced gas friction losses by rarefaction of the air.

The designs in accordance with the German patent 2,945,194 and the German patent 427,917 are however not applicable to motors operating with high internal gas pressures inside the housing.

In the German patent 2,928,393 a generator is disclosed which has an aluminum housing, in which a stator is attached and a rotor is mounted for rotating in relation to the stator. For the stator to be able to be held in position over a large operating temperature range and in order to provide for improved cooling, the stator has an external surface, which is in engagement with a press fit on an internal surface of the housing, over the entire operating range of the generator. In one of the surfaces a plurality of longitudinal grooves is formed so that the housing is able to be bent adjacent to the longitudinal grooves, when the generator is operating in the lower part of the temperature range. The longitudinal grooves are necessary in order for the electrical machine be utilized over the entire operating temperature range despite the use of materials with very different coefficients of thermal expansion. This design is however not suitable for high pressure motors.

SUMMARY OF THE INVENTION

In view of the foregoing, one object of the invention is to provide an electric motor of the type initially mentioned in which the amount of dissipated heat is less than dissipated heat in previous designs.

In accordance with the invention this object is attained by an electric motor having a capsule, which surrounds the rotor rods. The capsule can be arranged on the drive end (DE) and/or the non-drive end (NDE).

The presence of the capsule means that the rotor rods are covered. Without a cover the rotor rods would act as fan. Owing to covering effect afforded by the capsule such fan action is prevented. The quantity of heat dissipated is consequently considerably reduced.

The rotor is preferably designed as a squirrel cage rotor. The rotor rods extend past the lamination pack of the rotor. Owing to the presence of the capsule extending over the rotor rods, swirling and turbulence of the gas which would otherwise be caused by the rotor rods, is prevented inside the motor with the result that friction losses are reduced. The encapsulation in accordance with the invention ensures furthermore that the gas within the capsule is not swirled and blown around and that the fan action of the rotor rods, that is, the circulation of the gas in the interior of the motor, is avoided. In this respect the arrangement of the capsule is preferably such that movement of the rods owing to thermal effects is possible without limitation. A squirrel cage rotor design with projecting rods, extending from the lamination pack of the rotor, is preferably utilized in the case of motors, which are subject to high mechanical, electrical and thermal loads. In the case of motors without gage pressure in the interior, it is possible for the fan action of the rotor rods to be utilized for cooling the motor. In the case of motors operating with a gage pressure in their interior the design in accordance with the invention is employed.

The clearances on the capsule and at the respective points of connection, that is, those positions at which the capsule is in engagement with other components are preferably so laid down that movement of a gas current is not possible within the motor over the rotor rods and through the gaps adjacent to the capsule. Furthermore, the sliding motion of the squirrel cage rotor owing to thermal expansion of the rotor rods is ensured and there is a possibility of pressure compensation through the gaps and by the capsule and the points of connection or joints, that is, those points at which the capsule is connected with other components.

Since the capsule surrounds the rotor rods, it is impossible for the rotor rotating in the preferably compressed gas to cause any undesired frictional heat losses. Furthermore the rotor rods are not able to produce any gas flow and are therefore unable to produce any increase in pressure. The cooling of the submersible motor—and in this respect the low temperature of the water is taken advantage of—is by thermal conduction. Since substantially less heat is dissipated, no flow of cooling water in the interior of the motor and no cooling fins and cooling tubes or other heat exchanger means on the motor housing are necessary. The design of the motor and of the pressure-resistant housing is simpler nd more reliable owing to the type of cooling, to the design of the rotor and to the arrangement of the stator lamination pack.

The electric motor in accordance with the invention ensures furthermore that even in the case of high internal pressures within the motor—from 50 to 150 bar and upwards, frictional losses in the gas occurring when the rotor is rotating are kept sufficiently low with the result that the electric motor does not overheat. The electric motor in accordance with the invention is more particularly suitable as a submersible motor with high pressures inside the motor.

Further advantageous working embodiment of the invention are described hereinafter.

It is an advantage if the capsule surrounds the short-circuiting ring at the drive end and/or at the non-drive end. This means that the action of the capsule is even further improved. The undesired production of heat by friction is still further reduced so that there is even less dissipation of heat.

Preferably the capsule terminates at the end lamination of the pack of the rotor. This further improves the friction reducing effect of the capsule. More particularly, this means that the rotor loading plate is covered over on its outer periphery. The rotor rods extend through these loading plates of the rotor. In order to render this possible the rotor loading plate is slotted on its outer periphery, there being one slot for each rotor rod. The slots cause a dissipation of heat on rotation of the rotor. If the capsule covers over the rotor loading plate such heat dissipation is prevented.

In accordance with a further advantageous development of the invention the capsule comes to an end on the shaft. This measure as well causes a reduction in dissipation of heat.

Another advantageous feature of the invention is such that the capsule comes to an end on the rotor loading plate. The rotor loading plate may for this purpose be furnished with a projection or ledge coaxial to the shaft. In a corresponding manner it is possible for the capsule to have a projection or ledge which is coaxial to the rotor loading plate and is directed towards the same, which projection or ledge can cover over the corresponding ledge on the rotor loading plate.

In keeping with yet another embodiment of the invention, the above mentioned object is attained by providing a gap, in the cold condition, between the pressure-resistant housing of the motor and the lamination pack of the stator, such gap being of such a size that in the warm operating condition a press fit is established. Between the pressure-resistant housing of the motor and the lamination pack of the stator there is consequently a gap in the cold condition. The play-free fit responsible for the conduction of heat at this point only comes into existence in the hot operating condition so that an excessive press fit and consequently dangerous additional mechanical stresses in the pressure-resistant housing and in the lamination pack of the stator are prevented, which would otherwise be caused by the great temperature differences between the windings and the housing wall of the motor. Thus, it becomes simpler to conduct away dissipated heat.

Preferably there are no longitudinal grooves on the outer periphery of the rotor as in the German patent 2,928,393. This means that there is no interruption of the conduction of heat in the hot operating condition. Within the operating temperature range the outer surface of the rotor is hence completely free of any gap between it and the inner surface of the stator. For this purpose the surfaces adjacent to the gap on the housing (or stator) and the rotor (outer surface of the stator lamination pack) are preferably machined all over.

The design just described for attaining the object of the invention may be combined with the design first mentioned herein.

Further advantageous developments of the invention are described hereinafter.

For instance, the terminal stator laminations may be reinforced. Furthermore the engagement surfaces for the capsule may be machined. Preferably both the diameter and furthermore the abutment end surfaces for the capsule are machined.

The capsule may engage outer ends of the rotor rods, the periphery of the rotor loading plates and/or at least two surfaces on the short-circuiting rings. The capsule therefore may be in engagement with the outer surface of the rotor rods so that the gas inside the capsule rotates with the rotor rods without turbulence and not swirling around. These measures contribute to a reduction in fluid or gas losses owing to friction. Furthermore it is possible for the capsule to be in engagement with the periphery of the rotor loading plates. Moreover, it is possible for the capsule to be in engagement with at least two surfaces of the short-circuiting rings. This may further be rendered possible by a design such that the capsule surrounds and encircles the short-circuiting ring. However, a design is also possible in which the capsule is on one hand in engagement with the outer surface of the short-circuiting ring and on the other hand on the inner surface thereof. In this case the short-circuiting ring is not within the capsule and it is in fact a component of the capsule system (see below, FIG. 6).

The invention furthermore contemplates an arrangement in which the rotor, consisting of the shaft, the rotor lamination pack together with the short-circuiting cage and the capsules, has smooth end and cylindrical surfaces without grooves or fan vanes, and with a high degree of concentricity and surface finish.

The end cylindrical surfaces of the capsules and of the rotor lamination pack may be given a coating of a metallic or a nonmetallic material.

Preferably the stator lamination pack is held together by means of presser rings and welded on staples or a steel ring while the surface defining the gap adjacent to the pressure-resistant motor housing is machined over its entire area.

In accordance with a further advantageous development of the invention the stator lamination pack is attached at one end in the pressure-resistant motor housing using screws or using an interlocking connection.

A further advantageous working embodiment of the invention is characterized in that the pressure-resistant motor housing is designed with smooth outer surfaces without cooling fins and without cooling or radiating or heat pipes, although lifting coupling means (lifting eyes) may be provided.

On the free inner ends of the pressure-resistant motor housing it is possible to have a heat conducting coating or a thermally conducting means which increases the size of the surface area.

Preferably one or more thermometers are embedded, such as for instance, resistance thermometers in a pocket in the lamination pack of the stator.

In accordance with a still further embodiment of the invention the connection lines between the monitoring and control means at the non-drive end and the connection box are arranged in a groove, which is open towards the housing, in the lamination pack of the stator.

It is possible for the pressure compensating devices to be present on the bearings, the end plates, the capsules and the connection box.

Preferably the pressure-resistant motor housing is designed to be gas-tight and water-tight in such a manner that the gas pressure inside the housing may be higher than the external pressure and that furthermore the water pressure outside the housing may be greater than the internal gas pressure.

The pressure-resistant motor housing may be filled with a protective gas or with a fluid to be pumped, such as for instance natural gas.

The motor is preferably an asynchronous motor with a squirrel cage rotor.

The pressure-resistant motor housing may, in conjunction with the drive housing and the housing of the driven machine, constitute a single unit.

It is furthermore an advantage if the motor is designed for powering a compressor, a pump or a separator.

Between the motor and the drive or transmission or the housing of the driven machine it is possible to install a pressure-tight plate and seal.

One working embodiment of the invention will be explained with reference to the following detailed descriptive disclosure in conjunction with the accompanying drawings.

DETAILED DESCRIPTION OF THE DRAWINGS

Figure 1:
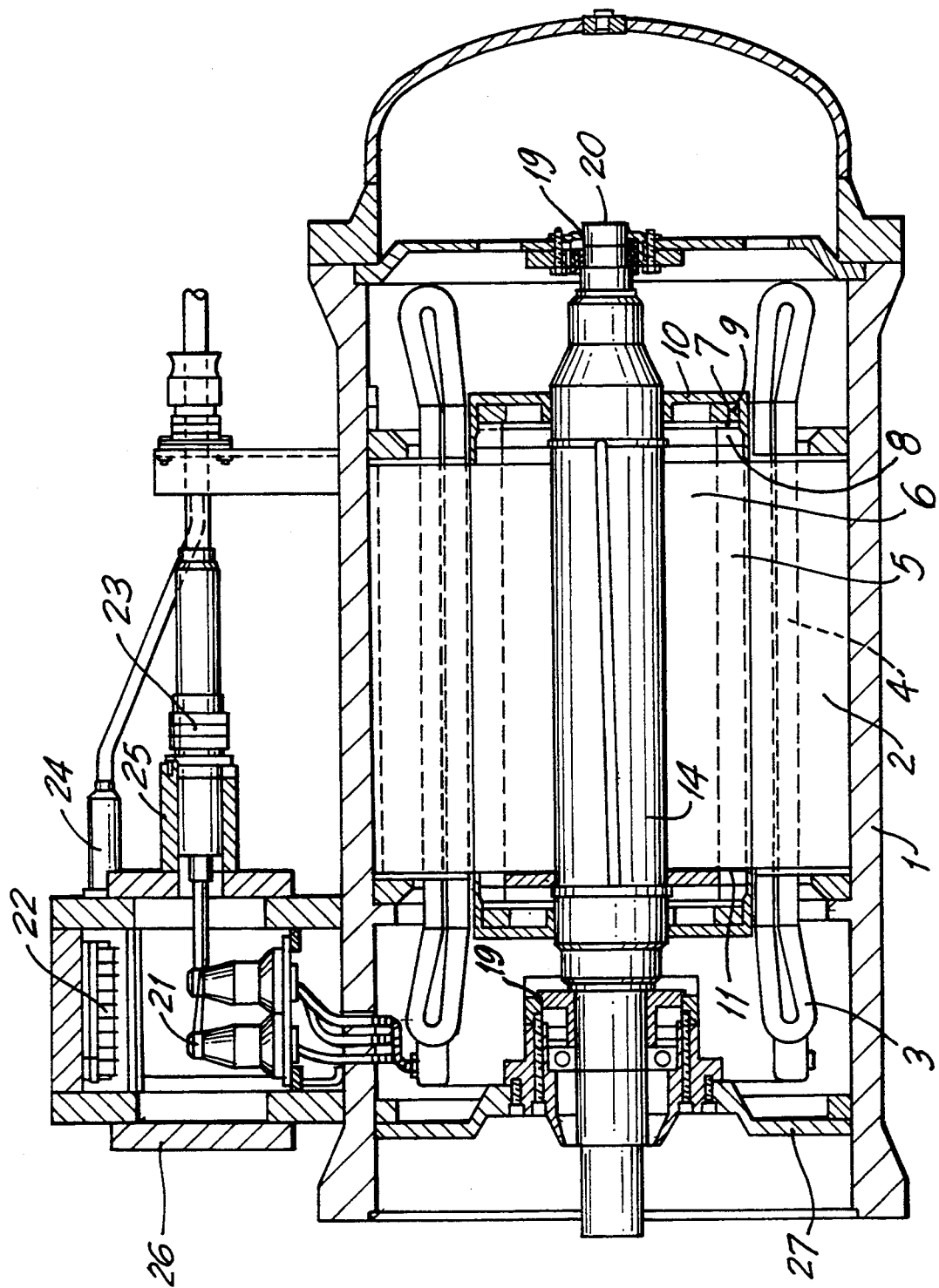
FIG. 1 shows a motor in longitudinal section.

The motor illustrated in FIG. 1 includes a pressure-resistant motor housing 1 with an electrical connection box 26, a stator lamination pack 2 with a stator winding 3 and a rotor 5 with a squirrel cage 8 and 9. The motor is filled with gas under a high pressure of between 5 and 150 bar or above. The filling consists of protective gas or fluid to be pumped, as for instance natural gas. The rotor 5 with the shaft 14 and the squirrel cage 8 and 9 is rotatably mounted in the motor. The rotor 5 is manufactured with smooth end and cylinder surfaces with a high accuracy in concentricity and surface finish. The squirrel cage, includes the rotor rods 8 and the short-circuiting rings 9, being completely enclosed so that the rotor rotating in the compressed gas is not subjected to any undesired frictional heating effects. In connection with the rotor rods 8 no gas flow is produced and no increase in the gas pressure results. The stator lamination pack 2 is attached with screws or with an interlocking means at the end in the pressure-resistant motor housing 1. For the connection of the motor winding 3 with the control and monitoring device (not illustrated FIG. 1), there is a respective connection space 21 and 22. The leadthroughs 23 and 24 for the lines are water- and gas-tight. The motor is cooled with water which surrounds the surface of the motor. The removal of the dissipated heat from the rotor sections 5, 6, 8, 9 and 10, the stator sections 4 and 2, the winding heads 3 and the bearings is by means of thermal conduction. the design of the housing surface (cooling surface) without cooling fins and without additional heat exchanging means, as for instance heat or cooling pipes, is rendered possible by the conductivity of steel and water.

Figure 2:
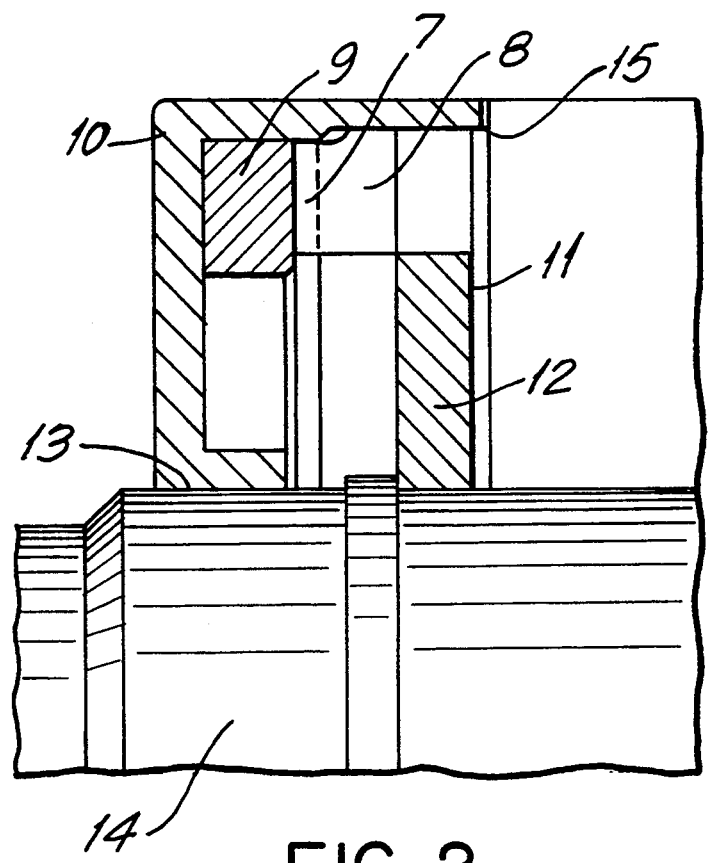
FIG. 2 shows a section taken through a part of the rotor.

FIG. 2 shows a section taken through part in the rotor 5. The rotor rods 8 and the short-circuiting rings 9 are surrounded by a capsule 10 terminating on the rotor lamination pack 11 and on the shaft 14 on the drive end (DE) and on the non-drive end (NDE), said capsule being composed of non-magnetic material. The terminal rotor lamination of the lamination pack are reinforced and the engagement surfaces 15 for the capsule 10, that is, the bore surface and the end surfaces, are machined. The capsule 10 is arranged on the outer side of the rotor rods 8, on the periphery of the rotor loading plates 12 and on at least two surfaces of the short-circuiting rings 9.

Figure 3:
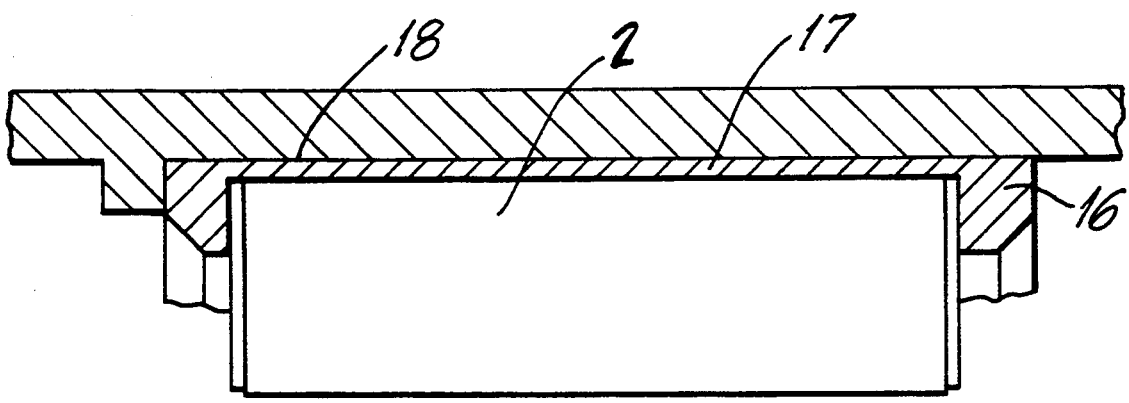
FIG. 3 is a section taken through part of the pressure-resistant housing of the motor and the stator lamination pack.

FIG. 3 shows a section of the part of the stator lamination pack 2. Between the pressure-resistant motor housing 1 and the stator lamination pack 2 there is a gap 18 in the cold condition. The play-free fit or seat necessary for thermal conduction at this point only becomes established when the motor reaches its operating temperature, this meaning that there is no excessive loading at the fit and there are no dangerous mechanical stresses in the pressure-resistant motor housing and inside the stator lamination pack.

Figure 4:
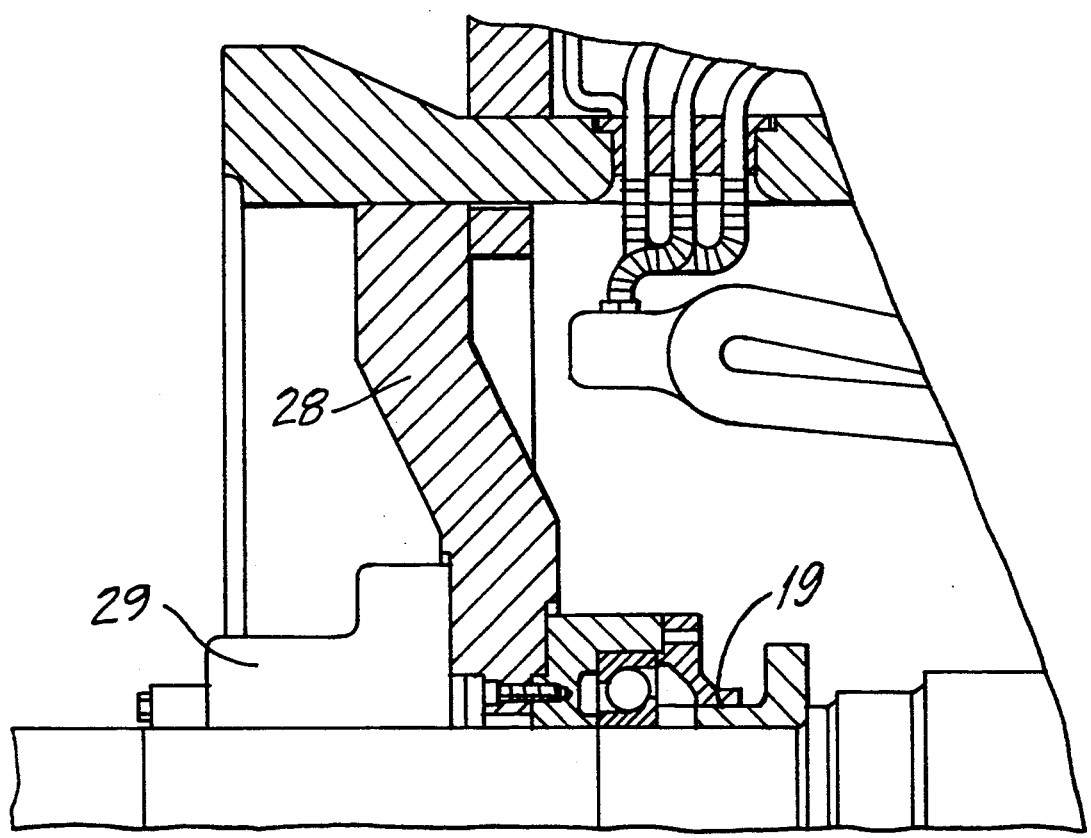
FIG. 4 shows a section taken through part of the motor with the drive end bearing and seal.

FIG. 4 shows an advantageous further development of the drive end of the motor according to the present invention. If required it is possible for the motor to be sealed off with the aid of a plate 28 and a seal 29, as for instance a slip-ring seal, from the transmission or the driven equipment in a pressure-tight manner.

Figure 5:
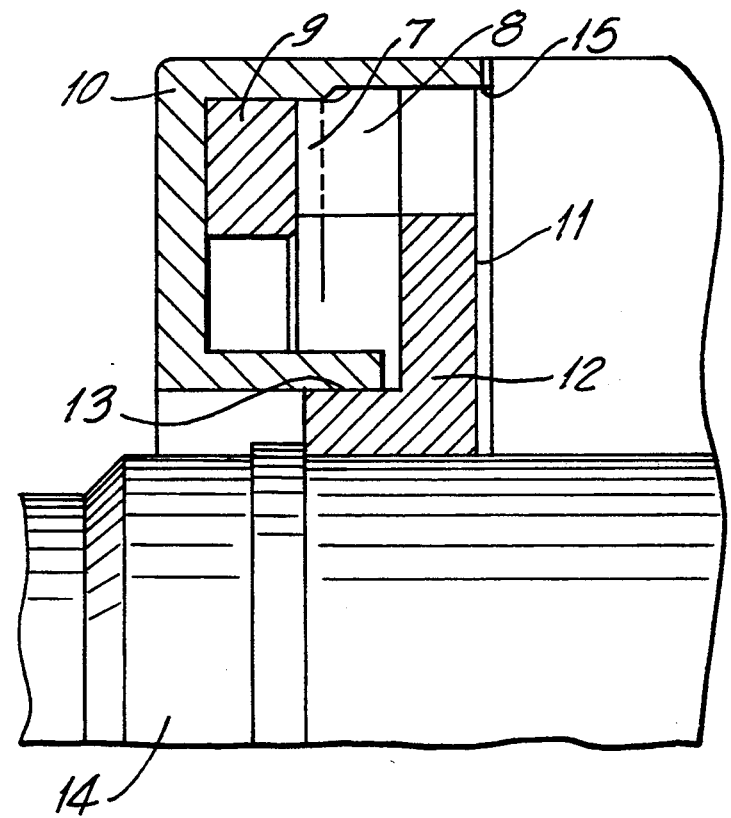
FIG. 5 shows a further working embodiment in a section, corresponding to FIG. 2, taken through part of the rotor.

FIG. 5 shows a modification of the design in accordance with FIG. 2, like parts being denoted by like reference numerals so that they do not have to be described over again. On its inner end, which is adjacent to the shaft 14 and rested thereon (to the left in the drawing) the loading end plate of the rotor 12 bears a head or ledge, which terminates on the collar provided on the shaft 14. The capsule 10 as well possesses a head or ledge facing inward (directed towards the right in the drawing), the circumference of such head extending with a clearance from the peripheral outer surface of the shaft 14 and corresponding to the outer circumference of the head on the rotor loading plate 12. The inner periphery of the head therefore rests on the outer periphery of the associated head of the rotor loading plate 12 at the indicated position. The shoulders or ledges of the capsule and of the rotor loading plate 12 overlap with each other. In the manner indicated in FIG. 5, the capsule comes to an end on the rotor loading plate 12 in the part 13. However there are other possibilities in this respect. For example the heads or ledges of the capsule 10 and of the rotor loading plate 12 can be abutted with each other axially.

The capsule 10 is attached to the short-circuiting ring 9. On its outer periphery the capsule 10 covers over the rotor rods 8. It furthermore covers the outer periphery of the rotor loading plate 12 and the slots in its outer peripheral surface, which render possible the passage of the rotor rods 8. The outer periphery of the capsule 10 extends as far as terminal rotor laminations 11, surrounding the short-circuiting ring 9 with its outer periphery and with its end surface running perpendicularly thereto.

Figure 6:
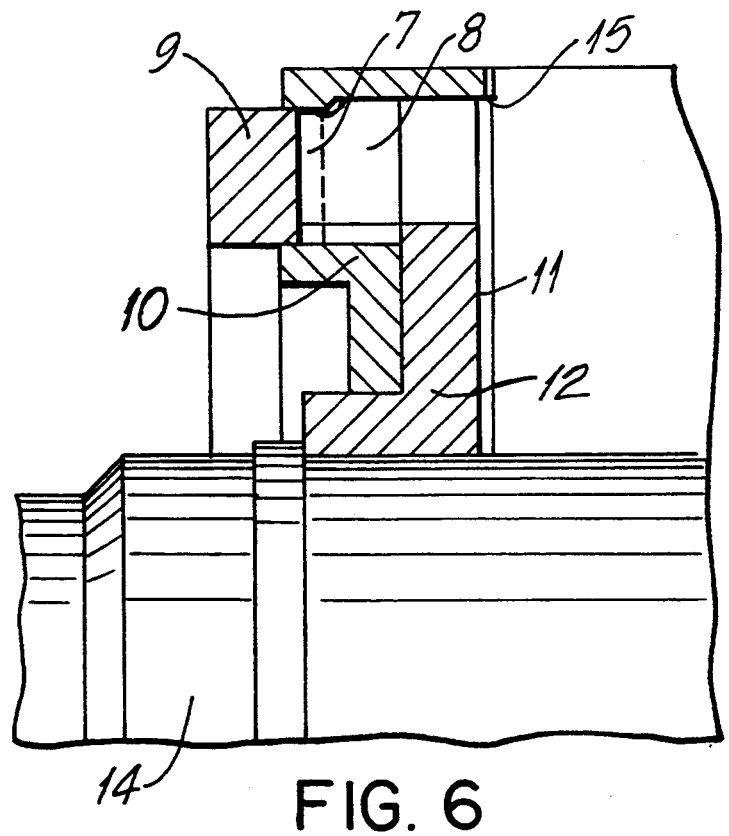
FIG. 6 shows a still further working embodiment in a section corresponding to FIGS. 2 and 5 through part of the rotor.

FIG. 6 shows a modification of the design in accordance with FIGS. 2 and 5, in which like parts are denoted by like reference numerals. The capsule 10 is made in two parts. The radially outer part illustrated at the top in FIG. 6 of the capsule 10 is arranged radially outside the rotor rods 8, and radially within the rotor rods 8 it then adjoins the inner part of the capsule 10. The outer part and the inner part of the capsule 10 overlap the outer end surfaces of the rotor rods 8. The capsule 10 abuts against two surfaces of the short-circuiting ring, that is, against its outer peripheral surface and against its inner peripheral surface. The outer part of the capsule 10 is so arranged that its inner surface, or particularly, the part overlapping the end of the rotor rods 8, of its inner surface abuts the outer surface of the short-circuiting ring 9. In a similar manner the part which overlaps the rotor rods 8, of the outer surface of the inner part of the capsule 10 abuts against the inner surface of the short-circuiting ring 9. The short-circuiting ring 9 is in this manner included within the capsule system for the rotor rods 8.

The rotor rods 8 extend past the lamination pack of the rotor. In a practical working embodiment of the invention the rotor rods extend at both ends of the lamination pack by 60 mm. The clearances of the capsule 10 on the end laminations 11 and/or on the shaft 14 and/or on the rotor loading plate 12 and/or on the short-circuiting rings 9 are so selected that there is no possibility of turbulence or circulation of gas inside the motor.

We claim:

1. An electric motor comprising a motor housing, in which stator is installed and a rotor with a shaft and squirrel cage is journaled for rotation, said rotor including a lamination pack and a plurality of rotor rods which extend beyond the lamination pack, said housing being filled with a gas, under a high pressure between 5 and 150 bar or greater, characterized by a capsule portion surrounding the rotor rods at a drive end (DE) of the rotor.

2. The electric motor as claimed in claim 1, wherein said capsule surrounds said rotor rods at a non-drive end (NDE) of the rotor.

3. The electric motor as claimed in claim 2, further including one or more short-circuiting rings at the drive end, characterized in that said capsule surrounds said short-circuiting rings.

4. The electric motor as claimed in claim 2, further including one or more short-circuiting rings at said non-drive end, wherein said capsule surrounds said short-circuiting rings.

5. The electric motor as claimed in claim 1, characterized in that said capsule comes to an end on the lamination pack of said rotor.

6. The electric motor as claimed in claim 1, characterized in that said capsule comes to an end on said shaft.

7. The electric motor as claimed in claim 1, characterized in that said capsule comes to an end on a loading plate of said rotor.

8. The electric motor as claimed in claim 1, wherein said rotor lamination pack is formed of a plurality of laminations, characterized in that the laminations adjacent a rotor end are reinforced.

9. The electric motor as claimed in claim 1, characterized in that the capsule includes abutment surfaces in the form of a bore, and end surfaces which are machined.

10. The electric motor as claimed in claim 1 characterized in that the capsule is in contact with the outer surface of the rotor rods on a periphery of rotor loading plates.

11. The electric motor as claimed in claim 1, further including one or more short circuiting rings, characterized in that the capsule is in contact with the outer surface of said rotor rods on at least two surfaces of said short-circuiting rings.

12. The electric motor as claimed in claim 1, characterized in that the rotor further comprises a short-circuiting cage and the capsule has end and cylindrical surfaces manufactured with substantially accurate concentricity and surface finish, without any grooves and fan vanes.

13. The electric motor as claimed in claim 12, characterized in that the end and cylindrical surfaces of the capsule and of the rotor lamination pack have a coating of either a metallic or nonmetallic material.

14. The electric motor as claimed in claim 12 further comprising a pressure-resistant housing and a stator lamination pack held together with press fit rings and braces welded in place.

15. The electric motor as claimed in claim 12 comprising a pressure resistant housing and a stator lamination pack held together with a steel ring, wherein an entire surface adjacent to the gap adjacent to said pressure resistant motor housing is machined.

16. The electric motor as claimed in claim 1, wherein said motor housing is pressure resistant and said stator has a lamination pack, characterized in that said lamination pack of the stator is secured with an interlocking connection at one end in said motor housing.

17. The electric motor as claimed in claim 1, wherein said housing is pressure resistant, characterized in that the pressure-resistant motor housing is designed with smooth external surfaces furnished with lifting rings without cooling fins and without cooling and heating pipes.

18. The electric motor as claimed in claim 1, wherein said housing is pressure resistant, characterized in that on the free inner side of the pressure-resistant motor housing a heat conductive coating, which increases the surface area, is provided.

19. The electric motor as claimed in claim 1, wherein said housing is pressure resistant and said stator has a lamination pack, characterized in that on the inner side of the pressure-resistant motor housing in a pocket inside the stator lamination pack one or more resistance thermometers are embedded.

20. The electric motor as claimed in claim 1, further having a stator lamination pack and a monitoring and control device at a non-drive end, characterized in that connection lines are laid between said non-drive end monitoring and control device and a connection space formed in a groove which is open towards the housing in said stator lamination pack.

21. The electric motor as claimed in claim 20, further characterized by a pressure compensating means on bearings, bearing mounts, the capsule and said connection space.

22. The electric motor as claimed in claim 1, wherein said housing is pressure resistant, characterized in that the pressure-resistant motor housing is made gas-tight and water-tight in such a manner that the gas pressure inside may be substantially higher than the external pressure upon said housing and in that furthermore the water pressure outside the housing may be larger than the gas pressure inside thereof.

23. The electric motor as claimed in claim 22, characterized in that the pressure-resistant motor housing is filled with a fluid to be pumped, said fluid including natural gas.

24. The electric motor as claimed in claim 1, characterized in that said motor is an asynchronous motor with a squirrel cage rotor.

25. The electric motor as claimed in claim 1, wherein said housing is pressure resistant, characterized in that the pressure-resistant motor housing constitutes a single unit in combination with a transmission housing and the housing of the driven equipment.

26. The electric motor as claimed in claim 1, characterized in that it is adapted to drive a compressor, a pump and a separator.

27. The electric motor as claimed in claim 1, wherein said motor is coupled to a transmission, characterized in that between the motor and said transmission, a pressure-tight plate and a seal are provided.

28. The electric motor as claimed in claim 1, characterized in that between the motor and housing of driven equipment coupled to said motor, a pressure-tight plate and seal are provided.

29. An electric motor comprising a pressure resistant motor housing, in which a stator having a stator lamination pack is installed and a rotor comprising a shaft, squirrel cage, and rotor lamination pack is journaled for rotation, said housing being preferably filled with a gas, more particularly a gas under a high pressure between 5 and 150 bar and greater, characterized in that in the cold state a gap is present between said motor housing and said stator lamination pack, said gap having such a size that in a hot operating condition a press fit is obtained between said stator lamination pack and said housing.

30. The electric motor as claimed in claim 29, characterized by a capsule surrounding said rotor rods at a drive end (DE) of the rotor.

31. The electric motor as claimed in claim 30, characterized by said capsule surrounding the rotor rods at a non-drive end (NDE) of the rotor.

32. The electric motor as claimed in claim 31, further including one or more short-circuiting rings at a drive end (DE) and a non-drive end (NDE) of the motor, characterized in that said capsule surrounds said short-circuiting rings.

33. The electric motor as claimed in claim 31, further having a rotor lamination pack, characterized in that said capsule comes to an end on said lamination pack of said rotor.

34. The electric motor as claimed in claim 31, characterized in that said capsule comes to an end on said shaft.

35. The electric motor as claimed in claim 31, characterized in that said capsule comes to an end on a loading plate of said rotor.

* * * * *